Dec. 4, 1956 G. LEES 2,773,169
WELDING OF BLADED ROTORS FOR TURBINES, COMPRESSORS, ETC.
Filed Feb. 18, 1952
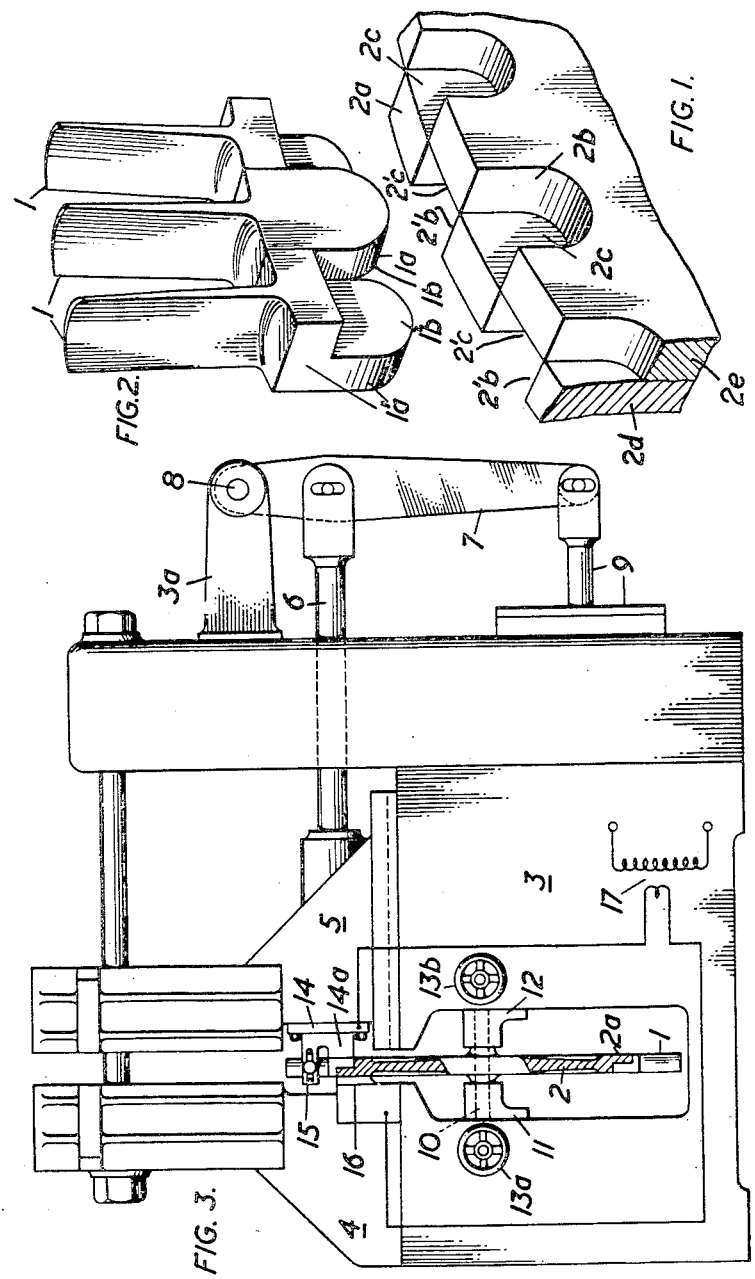
Inventor
George Lees
By
Stevens, Davis, Miller & Mosher
Attorneys

United States Patent Office 2,773,169
Patented Dec. 4, 1956

2,773,169

WELDING OF BLADED ROTORS FOR TURBINES, COMPRESSORS, ETC.

George Lees, Leicester, England, assignor to Power Jets (Research and Development) Limited, London, England, a British company Application February 18, 1952, Serial No. 272,001

Claims priority, application Great Britain February 26, 1951

3 Claims. (Cl. 219—117)

It is known to secure a ring of turbine or like blades to the rim of the rotor of a turbine or axial-flow compressor by a welding process in which metal is deposited from an electric arc-welding electrode.

According to the present invention the roots of the blades are welded in place on the appropriate part of the rim by a process utilising the arcing or sparking between that part and the root of the blade itself resulting from the passage of electric current between the two; with the root and the said part thus heated to welding temperature, pressure is applied to weld them together. More particularly, the blades are secured by flash-butt welding. The process allows the blades to be welded one at a time, or one small group at a time, with only local heating of the rotor for each welding operation.

The blade root could be welded (a) to the periphery of the rim by pressure acting inwardly towards the rotor axis, or (b) to a surface to which it is applied by pressure acting circumferentially or (c) to a surface to which it is applied by pressure acting along the rotor from one end towards the other. The weld produced by method a would be in tension under the centrifugal load on the blade; the weld produced by method b and c would be in shear.

It is however difficult to arrange clamps for applying inward pressure to the blade roots to weld them on to the periphery by method a. To apply method b it would be necessary to form abutments on the periphery, e. g. by providing some of the blades with deeper roots driven into seats formed by grooves across the rim, to which the edges of the other blade roots can be welded by applying the circumferential pressure.

To overcome these difficulties it is an important feature of the invention to form a step on one or each of the elements to be welded together, so that welding can take place between abutting surfaces transverse to and usually substantially at right angles to the rotor axis, these surfaces being welded together by pressure having an axial component.

One particular and preferred application of the invention to securing the single ring of blades 1 to the rim 2a of the disc type rotor 2 of an axial flow turbine is illustrated by the accompanying drawings Figs. 1–3 of which Fig. 1 is an elevation of part of the rim 2a, Fig. 2 is a view of blades separated from the rim and Fig. 3 is a view of the rotor in place in a welding machine. The rim 2a is recessed as shown in Fig. 1 to form a plurality of slots 2b therearound extending inwards from one end face and extending to the periphery of the rotor, alternating with like slots 2'b extending inwards from the other end face. The bottom of each slot is preferably rounded. The root 1a, 1'a of each blade 1 is of complementary shape to fit into a slot 2b, 2'b but part of the root is cut away—to the depth of the slot—to form a step with a surface 1'b (the like surface 1b on alternate blades being obscured) which abuts against the surface 2'c at the end of the slot (which in contrast to the like surface 2c of alternate recesses is obscured) when the blade is in correct position on the rim; the complementary abutting surfaces 1b and 2c 1'b and 2'c lie in planes which are transverse and preferably perpendicular to the rotor axis. The blade root 1a is pushed into the slot from one side of the rotor until the surfaces 1b and 2c engage and they are then welded together by electric flash-butt welding, i. e. with the parts only loosely in contact a heavy electric current is passed between the surfaces at a low voltage which is preferably too low to sustain an arc and when the parts are sufficiently heated by resulting sparking, the correct pressure for welding is applied to the outer end of the blade root 1a to force the step on the root against the end of the slot. The second blade is then inserted in a slot from the other side of the disc, while the third blade is inserted from the same side as the first and so on.

As shown the rotor 2 may be made up of two separate discs 2d and 2e having identical rims slotted right through their thickness, possibly by cutting slots right through both; the two discs are then relatively rotated through half the pitch of the slots and welded together in abutting contact.

For attaching the blades, the complete disc is mounted, as shown in Fig. 3, in a flash-butt welding machine on a mandrel 10 for rotation about the rotor axis.

The machine is of the usual type consisting of a bed 3, a welding head 4 fixed to the bed, a welding head 5 slidable on the bed, an actuating rod 6 for the head 5, an actuating lever 7 for the thrust rod 6 pivoted at 8 on a projecting part 3a of the bed, a hydraulic actuator 9 for the lever 7, a high-current low voltage electric supply device such as the transformer 17 and the usual timing and control devices. The mandrel 10 is carried by bearings 11 and 12 which can be raised and lowered and moved towards and away from the fixed head by handles 13a and 13b respectively. As the provision for such manipulation is entirely conventional it is not shown in Figure 3. It may consist however of a U shaped slide movable in vertical guides in the bed 3. The limbs of the U shape are disposed on either side of the rotor 2 and afford at their upper extremities aligned horizontal guides for the bearings 11 and 12. The part of the U slide interconnecting the limbs passes beneath the rotor 2 and embraces a vertical lead screw. A flexible or angled drive connects the handwheel 13a to the lead screw. The bearing 12 carries a horizontally extending toothed rack engaging a pinion rotatably mounted on the U slide to traverse the bearing 12 and attached structure 10, 11 relatively to the U slide. A flexible drive connects the handwheel 13b to the pinion, the flexibility of the drive accommodating vertical movement of the U slide. Mounted on the slidable welding head 5 is a fitting 14 including a part into which the blade—above the root—fits on one side along its length, and an abutment 14a bearing against the blade root 1a and carrying a clamp 15 for holding the blade tightly in place against the abutment 14a. The blade is thus securely held and accurately located.

With a blade 1 and the rotor 2 held in place, the rotor is raised by the hand wheel 13a and the rotor is rotated on the mandrel 10 until a slot is opposite the blade, when the head 5 is moved toward the rotor to insert the blade in the slot. There is an abutment 16 mounted on the fixed head 4 and the rotor can be tightly pressed against this by means of the hand wheel 13b. The electric supply device 17 is connected between the abutments 14a and 16, one or both being insulated from the machine.

When the machine is operated in the normal way for such machines, current will be applied with the blade lightly in contact with the rotor and after a time which allows the parts to reach the welding temperature sufficient pressure is applied by the actuator 9 through the lever 7 and the rod 6 to effect welding.

When the blade has been unclamped and the clamp withdrawn the rotor is released from the abutment 16. When a blade has been welded in this way in a slot in one end face of the rotor, said rotor can then be turned through twice the blade pitch to bring the next slot in the same end face opposite to another blade which has been inserted in the clamp and the welding operation repeated. These operations are repeated until all the odd-numbered blades (i. e. the first, third, fifth, etc.) have been welded in place from one side or end face of the disc. The rotor is removed from the machine, allowed to cool down and then re-inserted in the machine the reverse way round and the sequence is repeated to weld the second, fourth, sixth and remaining blades in slots in the other end face of the disc.

I claim:

1. A method of constructing a turbine-bladed rotor by welding a ring of blades around the rim of the rotor which consists in first forming the rotor with a plurality of recesses therearound extending inwards from one end face and extending to the periphery of the rotor, alternating with like recesses extending inwards from the other end face, and forming the blade roots with steps to provide faces thereon complementary to the faces at the bottom of each recess, these complementary faces lying in planes which are transverse to the direction of the rotor axis, then placing a blade in one of said recesses in one end face, heating the now opposed complementary faces by arcing or sparking resulting from the passage of electric current from one to the other, with pressure applied to weld said opposed complementary faces together, and repeating this operation with another blade in the next recess in said one end face and so on until half of the blades (i. e. the first, third, fifth etc.) have been welded to the rotor, and finally repeating the sequence with the second, fourth, sixth and remaining blades in the recesses on the other end face of the rotor.

2. The method according to claim 1, wherein the recesses in the rotor are formed by recessing the rotor rim, each recess extending inwardly from one end face and to the periphery of the rotor.

3. The method of constructing an axial flow turbine-bladed rotor by attaching a root at the radially inner end of each of a plurality of blades including the steps of forming recesses in the rotor by slottting two metal discs similarly at intervals around their periphery, and securing the discs together co-axially with the slots in one opposite to the metal between the slots in the other to form a rotor having therearound peripheral recesses in one face alternating with like recesses in the other face, forming a complementary step on the root of each of a plurality of blades so that thus there is a face on the rotor at the bottom of each recess and a complementary face on each blade root which faces extend both radially of and lie in planes which are transverse to the direction of the rotor axis, bringing in respect of each blade said faces adjacent to one another, passing electric current from one to the other of said faces until they are heated to welding temperature by the resulting arcing or sparking between them, and applying pressure to weld said faces together, said pressure having at least a component in the direction of the rotor axis.

References Cited in the file of this patent

UNITED STATES PATENTS

| | | |
|---|---|---|
| 1,148,221 | Farranti | July 27, 1915 |
| 1,639,109 | Putnam | Aug. 16, 1927 |
| 1,744,757 | Ferguson | Jan. 28, 1930 |
| 1,779,563 | Siebs | Oct. 28, 1930 |
| 1,861,025 | Pavlecka | May 31, 1932 |
| 1,884,252 | Robinson | Oct. 25, 1932 |
| 1,952,474 | Tarbox | Mar. 27, 1934 |
| 2,159,916 | Vang | May 23, 1939 |
| 2,345,918 | Dahlstrand | Apr. 4, 1944 |
| 2,347,034 | Doran | Apr. 18, 1944 |
| 2,402,204 | Phelan | June 18, 1946 |
| 2,431,249 | Heppner | Nov. 18, 1947 |
| 2,448,825 | Price | Sept. 7, 1948 |
| 2,450,493 | Strub | Oct. 5, 1948 |
| 2,454,580 | Thielemann | Nov. 23, 1948 |
| 2,524,369 | Tiedemann | Oct. 3, 1950 |
| 2,604,569 | Denneen | July 22, 1952 |
| 2,639,119 | Greenwald | May 19, 1953 |

FOREIGN PATENTS

| | | |
|---|---|---|
| 661,009 | Germany | June 9, 1938 |